(12) United States Patent
Nonaka et al.

(10) Patent No.: US 11,093,877 B2
(45) Date of Patent: Aug. 17, 2021

(54) INSPECTION PLAN DRAFTING SUPPORT SYSTEM, METHOD, AND PROGRAM

(71) Applicant: FUJIFILM Corporation, Tokyo (JP)

(72) Inventors: Shunichiro Nonaka, Tokyo (JP); Masayuki Negoro, Tokyo (JP); Satoshi Kubota, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 656 days.

(21) Appl. No.: 15/909,188

(22) Filed: Mar. 1, 2018

(65) Prior Publication Data

US 2018/0189705 A1 Jul. 5, 2018

Related U.S. Application Data

(63) Continuation of application No. PCT/JP2016/058993, filed on Mar. 22, 2016.

(30) Foreign Application Priority Data

Sep. 25, 2015 (JP) .............................. JP2015-188536

(51) Int. Cl.
*G06Q 10/06* (2012.01)
*G06Q 10/10* (2012.01)
(Continued)

(52) U.S. Cl.
CPC ....... *G06Q 10/06315* (2013.01); *G06Q 10/10* (2013.01); *G06Q 10/20* (2013.01);
(Continued)

(58) Field of Classification Search
CPC .. G06Q 10/06315; G06Q 10/10; G06Q 10/20; G06Q 50/08; G06Q 50/163; G06T 7/97
(Continued)

(56) References Cited

U.S. PATENT DOCUMENTS 6,317,387 B1 * 11/2001 D'Amaddio ........... G01N 29/28
367/129
7,546,224 B2 * 6/2009 Campbell .............. G05B 17/02
703/1
(Continued)

FOREIGN PATENT DOCUMENTS

JP 2002-279043 A 9/2002
JP 2004-318790 A 11/2004
(Continued)

OTHER PUBLICATIONS

International Search Report issued in PCT/JP2016/058993; dated Apr. 26, 2016.
(Continued)

*Primary Examiner* — Justin C Mikowski
(74) *Attorney, Agent, or Firm* — Studebaker & Brackett PC

(57) ABSTRACT

A structural object data input unit receives an input of structural data of a target structural object to be inspected, and an attribute information input unit receives an input of attribute information of the target structural object. Next, an inspection location determination unit specifies a location having stress applied thereto in the target structural object, and determines an inspection required location of the target structural object on the basis of a result of the determination. Next, an inspection plan creation unit creates an inspection plan on the basis of the specification result for the inspection required location, and outputs the created inspection plan to a display unit. Thereby, the inspection plan is displayed on the display unit.

20 Claims, 6 Drawing Sheets

(51) Int. Cl.
*G06Q 50/08* (2012.01)
*G06T 7/00* (2017.01)
*G06Q 10/00* (2012.01)
*G06Q 50/16* (2012.01)

(52) U.S. Cl.
CPC .......... *G06Q 50/08* (2013.01); *G06Q 50/163* (2013.01); *G06T 7/97* (2017.01)

(58) Field of Classification Search
USPC .......................................................... 703/1
See application file for complete search history.

(56) References Cited

U.S. PATENT DOCUMENTS

| | | | |
|---|---|---|---|
| 8,266,066 B1* | 9/2012 | Wezter | G06Q 10/06 705/78 |
| 9,581,570 B2* | 2/2017 | Caicedo | G01N 29/4472 |
| 10,275,546 B2* | 4/2019 | Nishida | G06F 30/20 |
| 2009/0070048 A1* | 3/2009 | Stothers | G01N 29/045 702/39 |
| 2010/0161244 A1* | 6/2010 | Ghoshal | G01N 29/14 702/35 |
| 2014/0244133 A1* | 8/2014 | De Prosperis | G05B 23/0208 701/100 |
| 2014/0336928 A1* | 11/2014 | Scott | G01C 21/206 701/468 |
| 2015/0134545 A1* | 5/2015 | Mann | G06F 30/13 705/305 |
| 2015/0178412 A1* | 6/2015 | Grau | G01B 5/004 703/1 |

FOREIGN PATENT DOCUMENTS

| | | |
|---|---|---|
| JP | 2008-059376 A | 3/2008 |
| JP | 2008-297764 A | 12/2008 |
| JP | 2008297764 A * | 12/2008 |
| JP | 2010-097392 A | 4/2010 |

OTHER PUBLICATIONS

Written Opinion issued in PCT/JP2016/058993; dated Apr. 26, 2016.
International Preliminary Report on Patentability issued in PCT/JP2016/058993; dated Jul. 4, 2016.

* cited by examiner

FIG. 4

| ITEM NUMBER | BRIDGE NAME | STRUCTURE | AREA | YEARS AFTER CONSTRUCTION | SPRAYING HISTORY OF ANTIFREEZING ADMIXTURE | CONSTRUCTOR | CONCRETE MEMBER EVALUATION | STEEL MEMBER EVALUATION | PREVIOUS INSPECTION | RECOMMENDED INSPECTION TIME |
|---|---|---|---|---|---|---|---|---|---|---|
| 1 | A LARGE BRIDGE | STEEL PLATE GIRDER | SEACOAST | 10 YEARS | THREE TIMES/YEAR | COMPANY X | A | B | OCTOBER, 2010 | OCTOBER, 2015 |
| 2 | B BRIDGE | PC BOX GIRDER | PLAIN | 15 YEARS | TWICE/YEAR | COMPANY Y | A | C | JUNE, 2012 | JUNE, 2017 |
| 3 | C RIVER LARGE BRIDGE | PC BOX GIRDER | MOUNTAIN RIDGE | 32 YEARS | FIVE TIMES/YEAR | COMPANY Z | B | A | JANUARY, 2013 | JANUARY, 2016 |
| 4 | D BRIDGE | STEEL BOX GIRDER | SEACOAST | 70 YEARS | NO | COMPANY X | B | C | FEBRUARY, 2014 | FEBRUARY, 2017 |
| 5 | E BRIDGE | STEEL PLATE GIRDER | MOUNTAIN RIDGE | 41 YEARS | NO | COMPANY Y | C | B | MARCH, 2014 | MARCH, 2017 |

US 11,093,877 B2

INSPECTION PLAN DRAFTING SUPPORT SYSTEM, METHOD, AND PROGRAM

CROSS-REFERENCE TO RELATED APPLICATIONS

This application is a Continuation of PCT International Application No. PCT/JP2016/058993 filed on Mar. 22, 2016, which claims priority under 35 U.S.C § 119(a) to Patent Application No. 2015-0188536 filed in Japan on Sep. 25, 2015, all of which are hereby expressly incorporated by reference into the present application.

BACKGROUND OF THE INVENTION

1. Field of the Invention

The present invention relates to an inspection plan drafting support system, a method, and a non-transitory computer recording medium storing a program, and more particularly, to an inspection plan drafting support system, a method, and a non-transitory computer recording medium storing a program for supporting drafting of an inspection plan for a structural object such as a bridge.

2. Description of the Related Art

JP2002-279043A discloses that a list of locations (predicted locations of stress concentration) which have stress easily concentrated thereon and are required to be inspected is extracted to inspection the safety of only the predicted stress concentration locations in priority and to infer safety for a portion having a relatively high strength from inspection results of the predicted stress concentration locations in a building maintenance system that reduces work related to the maintenance of a building (paragraph <0028>).

SUMMARY OF THE INVENTION

In JP2002-279043A, the safety of portions other than the predicted stress concentration locations is inferred from the inspection results of the predicted stress concentration locations, but there is a concern that the extraction of an inspection location is not sufficient in an inspection focusing on only the predicted stress concentration locations.

The invention is contrived in view of such a situation, and an object thereof is to provide an inspection plan drafting support system, a method, and a non-transitory computer recording medium storing a program which are capable of appropriately collecting data regarding a structural object to be inspected and appropriately detecting an inspection required location by simple means.

In order to solve the above-described problem, an inspection plan drafting support system according to a first aspect of the invention is an inspection plan drafting support system for supporting the drafting of an inspection plan for a structural object, the inspection plan drafting support system comprising structural data input unit that inputs structural data indicating a structure of the structural object, attribute information input unit that inputs attribute information including information indicating an attribute of the structural object, determination unit that determines inspection required locations of the structural object on the basis of the structural data and the attribute information, creation unit that creates the inspection plan for the structural object on the basis of a positional relationship between the inspection required locations, and inspection priorities of the inspection required locations, and output unit that outputs the inspection plan created by the creation unit.

In the inspection plan drafting support system of a second aspect of the invention according to the first aspect, the attribute information input unit may input the attribute information including at least one of a material, elapsed years, or a lifespan of the structural object, or an installation environment or a repair history of the structural object.

According to the first and second aspects, it is possible to appropriately extract the inspection required locations by acquiring structural data and attribute data of a structural object to be inspected (target structural object).

The inspection plan drafting support system of a third aspect of the invention according to the first or second aspect may further comprise stereoscopic structure information acquisition unit that acquires stereoscopic structure information obtained by measuring the structural object, in which the creation unit may calculate the positional relationship between the inspection required locations on the basis of the structural data and the stereoscopic structure information, and may determine the order of inspection for the inspection required locations on the basis of the positional relationship to create the inspection plan for the structural object.

According to the third aspect, it is possible to mount an inspection device and to appropriately set a movement route by using the stereoscopic structure information. Thereby, it is possible to more efficiently create the inspection plan.

In the inspection plan drafting support system of a fourth aspect of the invention according to the third aspect, the stereoscopic structure information acquisition unit may acquire stereoscopic structure information indicating a stereoscopic positional relationship between the inspection required locations of the structural object and distance information from a stereoscopic image obtained by imaging the structural object.

According to the fourth aspect, in a case where precise structural data cannot be obtained, it is possible to acquire structural data by using a stereoscopic image obtained by imaging a structural object.

The inspection plan drafting support system of a fifth aspect of the invention according to the first aspect may further comprise calculation unit that calculates distortion of the structural objects on the basis of the structural data, in which the creation unit may create the inspection plan on the basis of the distortion.

According to the fifth aspect, it is possible to extract a location where distortion may occur, as the inspection required location by utilizing the structural data.

The inspection plan drafting support system of a sixth aspect of the invention according to the first to fifth aspects may further comprise detection result acquisition unit that acquires a result of detection of damage occurring in a past inspection, in which the creation unit may create the inspection plan on the basis of the detection result of the damage, in addition to the positional relationships between the inspection required locations and the inspection priorities of the inspection required locations.

According to the sixth aspect, it is possible to extract a location where it is expected that damage easily occurs as the inspection required location by using the detection result of the past damage.

The inspection plan drafting support system of a seventh aspect of the invention according to the first to sixth aspects may further comprise plan input unit that receives an input of at least one plan out of the inspection plan or a repair plan for the structural object, in which the creation unit may create the inspection plan on the basis of the plan received by the plan input unit.

In the inspection plan drafting support system of an eighth aspect of the invention according to the seventh aspect, the plan input unit may receive an input of an inspection time determined for the structural object, and the creation unit may make an inspection time, which is determined for the structural object based on the inspection plan, and matches the inspection time based on the input.

According to the seventh and eighth aspects, it is possible to collectively perform inspections at an inspection time which is set by another system or the like. Thereby, it is possible to efficiently perform the inspection plan.

An inspection plan drafting support method according to a ninth aspect of the invention is an inspection plan drafting support method for supporting drafting of an inspection plan for a structural object, the inspection plan drafting support method comprising inputting structural data indicating a structure of the structural object, inputting attribute information including information indicating an attribute of the structural object, determining inspection required locations of the structural object on the basis of the structural data and the attribute information, creating the inspection plan for the structural object on the basis of a positional relationship between the inspection required locations, and inspection priorities of the inspection required locations, and outputting the created inspection plan.

A non-transitory computer recording medium storing an inspection plan drafting support program of a tenth aspect of the invention is an inspection plan drafting support program for supporting drafting of an inspection plan for a structural object, the inspection plan drafting support program causing a computer to realize a structural data input function for inputting structural data indicating a structure of the structural object, an attribute information input function for inputting attribute information including information indicating an attribute of the structural object, a determination function for determining inspection required locations of the structural object on the basis of the structural data and the attribute information, a creation function for creating the inspection plan for the structural object on the basis of a positional relationship between the inspection required locations, and inspection priorities of the inspection required locations, and an output function for outputting the inspection plan created by the creation function.

According to the invention, it is possible to appropriately extract an inspection required location by acquiring and using structural data and attribute data of a target structural object.

BRIEF DESCRIPTION OF THE DRAWINGS

FIG. 4 is a diagram illustrating a specific example of the output of attribute information and an inspection plan in a case where a target structural object is a bridge.

DESCRIPTION OF THE PREFERRED EMBODIMENTS

Hereinafter, preferred embodiments of an inspection plan drafting support system, a method, and a program according to the invention will be described with reference to the accompanying drawings.

[Configuration of Inspection Plan Drafting Support System]

Figure 1:
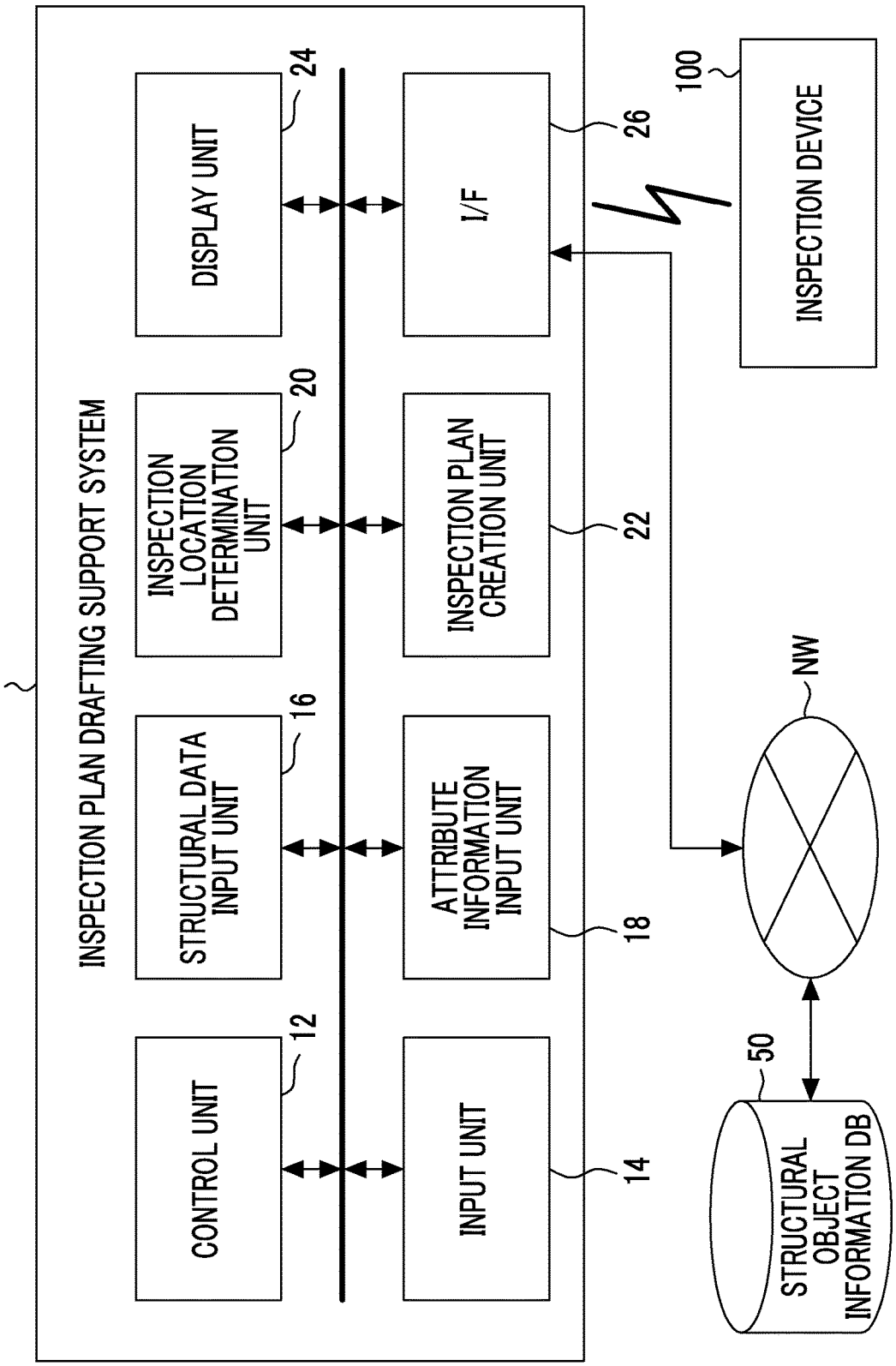
FIG. 1 is a block diagram illustrating a configuration of an inspection plan drafting support system according to an embodiment of the invention.

FIG. 1 is a block diagram illustrating a configuration of an inspection plan drafting support system according to an embodiment of the invention.

An inspection plan drafting support system 10 according to this embodiment includes a control unit 12, an input unit 14, a structural data input unit 16, an attribute information input unit 18, an inspection location determination unit 20, an inspection plan creation unit 22, a display unit 24, and a communication interface (I/F) 26.

The control unit 12 includes a Central Processing Unit (CPU) that controls the operation of each unit of the inspection plan drafting support system 10, a Read Only Memory (ROM) that stores control programs, and a Synchronous Dynamic Random Access Memory (SDRAM) which is usable as a work area of the CPU. The control unit 12 receives an operation input by an operator through the input unit 14 (for example, a keyboard, or a pointing device such as a mouse or a touch panel), and transmits a control signal based on the operation input to each unit of the inspection plan drafting support system 10 through a bus to control the operation of each unit.

The inspection plan drafting support system 10 including a communication interface (I/F) 26 can communicate with an inspection device 100 through the I/F 26. The inspection plan drafting support system 10 can transmit inspection plan data (including, for example, a mounting position of the inspection camera 102, (see FIG. 2), the designation of a mounting part and a tool, a movement route and control information (pose during imaging (direction and/or angle) of the inspection camera 102, information for controlling zooming and the like, an object to be imaged, information regarding an inspection time and the like) to the inspection device 100 in accordance with a request from the inspection device 100. As a method of communication between the inspection plan drafting support system 10 and the inspection device 100, it is possible to use wired communication (for example, connection through a Universal Serial Bus (USB) cable, a Local Area Network (LAN), a Wide Area Network (WAN), the Internet, and the like) or wireless communication (for example, connection through a LAN, a WAN, the Internet, Bluetooth (registered trademark), infrared communication, and the like).

The structural data input unit 16 (structural data input means) receives an input of structural data of a structural object to be inspected (target structural object). The structural data includes information indicating the structure of the structural object and design data (for example, Computer Aided Design (CAD) data).

The attribute information input unit 18 (attribute information input means) receives an input of attribute information including at least one of a material, a number of elapsed years, and a lifespan of a target structural object or an installation environment and a repair history of the target structural object.

Meanwhile, the structural data and the attribute information may be input by an operator through the input unit 14, or may be read through a recording medium (for example, a USB memory, an SD card (registered trademark), and the like). In addition, the structural data and the attribute information may be acquired by retrieving a structural object information database 50 (structural object DB) in which the structural data and the attribute information of the structural object are accumulated through a network NW. Furthermore, the structural object information database 50 may be included in the inspection plan drafting support system 10.

The inspection location determination unit 20 (determination means) specifies an inspection required location which needs to be inspected on the basis of the structural data and the attribute information of the target structural object. The inspection location determination unit 20 extracts a location where stress easily concentrates, a bonding location where a plurality of members are bonded to each other, a location exposed to salty wind, and the like in the target structural object, as inspection required locations having high inspection priorities. Determination results for the inspection required locations by the inspection location determination unit 20 are output from the inspection location determination unit 20 to the inspection plan creation unit 22.

The inspection plan creation unit 22 (creation means) creates an inspection plan (including, for example, a mounting position of the inspection camera 102 (see FIG. 2), the designation of a mounting part and a tool, a movement route of the inspection camera 102, the order of an inspection, control information (pose during imaging (direction and/or angle), information for controlling zooming and the like, an object to be imaged, information regarding an inspection time, and the like) of the structural object on the basis of the structural data and the attribute information of the target structural object and specification information of the inspection required location, and outputs the created inspection plan to the display unit 24.

The display unit 24 (output means) is means (for example, a liquid crystal display) for displaying an operation Graphical User Interface (GUI) of the inspection plan drafting support system 10 or an image (a photo indicating, for example, an inspection result, a repair result, changes in an inspection location with time, and the like), and displays the inspection plan which is created by the inspection plan creation unit 22.

Meanwhile, as the output means for the inspection plan, printing means for printing the inspection plan in accordance with a predetermined form can also be provided instead of the display unit 24 or in addition to the display unit 24.

According to this embodiment, it is possible to appropriately extract an inspection required location by acquiring and using structural data and attribute data of a target structural object.

Meanwhile, in a case where precise design data such as CAD data cannot be obtained (in a case where precise design data does not remain, such as a case where a structural object is old or complicated repair is not performed a plurality of times), it is possible to acquire a stereoscopic image (3D image) of the entire target structural object or each unit thereof by imaging a target structural object and to acquire structural data by analyzing image data of the structural object. In this case, the target structural object is imaged by using the inspection camera 102 (see FIG. 2) or a stereoscopic camera not shown in the drawing (for example, a multi-viewpoint camera capable of capturing an image from a plurality of viewpoints), and the captured image data is input to the inspection plan drafting support system 10 through the I/F 26 (stereoscopic structure information acquisition means).

The inspection location determination unit 20 analyzes the image data to create structural data including a stereoscopic structure (a pillar, a foundation, and a floor portion of the structural object, positions of a bridge pier and a bridge girder, information indicating a dimension and/or an outline shape (for example, a box girder and a plate girder), and the like, and stereoscopic structure information) of the target structural object, distance information, and the position of a bonding location. The inspection location determination unit 20 determines an inspection required location by using the structural data, and the inspection plan creation unit 22 creates an inspection plan by using the structural data.

In a case where the image of the structural object is performed, an imaging plan (a plan of a preliminary inspection) may be drafted on the basis of outline structural data regarding the outline structure of the target structural object by receiving an input of the outline structural data through the structural data input unit 16 and the attribute information input unit 18, and the drafted preliminary inspection plan may be transmitted to the inspection device 100. Here, the outline structural data may include, for example, information indicating the type of structural object (for example, a bridge (a rigid-frame bridge, a suspension bridge, an oblique bridge, an arch bridge, a movable bridge (draw bridge), or the like), a building, a tower), information indicating an outline structure (information indicating a pillar, a foundation, and a floor portion of the structural object, outline positions of a bridge pier and a bridge girder, a dimension and/or a shape (for example, a box girder and a plate girder), and the like), topography information of the structural object (for example, positional information (Global Positioning System (GPS) information and the like), information regarding geographical conditions (a distance from mountain forest, river, lake and/or sea, the strength of seacoast, plain, mountain ridge, and ground, and the like)). Information regarding the preliminary inspection plan may include, for example, a mounting position of the inspection camera 102, the designation of a mounting part and a tool, a movement route of the inspection camera 102, the order of an inspection, control information (pose during imaging (direction and/or angle), information for controlling zooming and the like), and information regarding an object to be imaged, and the like.

As described above, a preliminary inspection plan is drafted on the basis of rough outline structural data which is easily achievable, and thus it is possible to efficiently perform a preliminary inspection for acquiring precise structural data.

Here, when the inspection plan is created, distortion occurring in the target structural object, a detection result or a repair result of damage in the past, or at least one of an inspection plan or a repair plan which is made by another system may be reflected in the inspection plan. For example, the inspection plan creation unit 22 (calculation means) evaluates, for example, the volume of traffic in a bridge on the basis of the structural data and the attribute data to analyze the distribution of a force applied to the entire structural object, and extracts a location for which it is determined that distortion may occur in the structural object, as an inspection required location.

In addition, the inspection plan creation unit 22 acquires the detection result or the repair result of damage in the past through the I/F 26 (detection result acquisition means), and extracts a location where damage (for example, a crack and rust in a bridge pier) was detected in the past, as an inspection required location. In addition, the inspection plan creation unit 22 may extract a location where damage was detected in the past and a location (for example, a bonding portion) having stress concentrated on is present in the vicinity (for example, the same member and the same bridge pier) thereof, as an inspection required location where distortion easily occurs.

In addition, the inspection plan creation unit 22 acquires information regarding an inspection plan and a repair plan (for example, a plan of a legal inspection, and the like) which is separately made by another system through the I/F 26 (plan input means), for example, from an external database such as a structural object information DB 50 or by a direct input from the input unit 14. In a case where an inspection plan or a repair plan which is additionally made is set until a recommended inspection time which is calculated on the basis of the structural data, the attribute information, and the like, the inspection plan creation unit 22 advances the recommended inspection time and sets the recommended inspection time to be a time of the additional inspection plan or repair plan. Thereby, it is possible to collectively perform the inspections.

[Configuration of Inspection Device]

Figure 2:
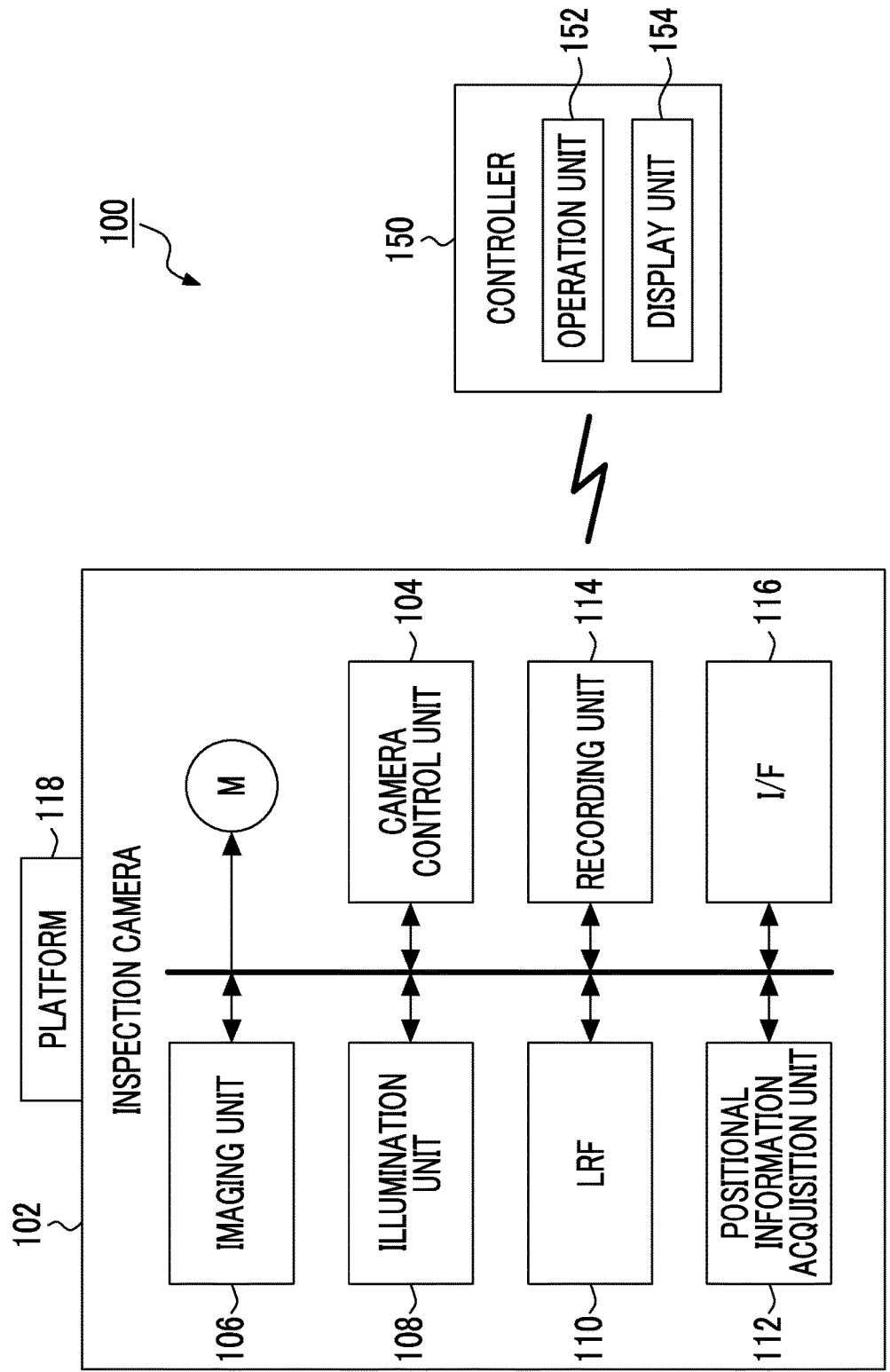
FIG. 2 is a block diagram illustrating a configuration of an inspection device according to the embodiment of the invention.

Next, an example of the inspection device 100 will be described with reference to FIGS. 2 and 3. FIG. 2 is a block diagram illustrating a configuration of the inspection device according to the embodiment of the invention.

The inspection device 100 according to this embodiment includes the inspection camera 102 and a controller 150. The inspection camera 102 includes a camera control unit 104, an imaging unit 106, an illumination unit 108, an LRF 110, a positional information acquisition unit 112, a recording unit 114, and a communication interface (I/F) 116.

The camera control unit 104 includes a CPU that controls the operation of each unit of the inspection camera 102, a ROM that stores control programs, and an SDRAM which is usable as a work area of the CPU. The camera control unit 104 receives an operation input by an operator through the controller 150, and transmits a control signal based on the operation input to each unit of the inspection camera 102 through a bus to control the operation of each unit.

The controller 150 includes an operation unit 152 and a display unit 154. As the controller 150, it is possible to use a tablet terminal including the display unit 154 (for example, a liquid crystal display) for displaying an image captured by the inspection camera 102 and an operation GUI and an operation unit 152 which is constituted by a touch panel formed on the surface of the display unit 154.

The communication interface (I/F) 116 is means for performing communication connection with the controller 150. As a method of communication between the inspection camera 102 and the controller 150, it is possible to use wired communication (for example, connection through a USB cable, connection through a LAN, a WAN, and the Internet, and the like) or wireless communication (for example, connection through a LAN, a WAN, and the Internet, Bluetooth (registered trademark), infrared communication, and the like).

The imaging unit 106 is means for imaging a subject (an inspection location of a target structural object) and includes, for example, a zoom lens, a focus lens, a stop, and an imaging element. The image (still image, motion picture) which is captured by the imaging unit 106 is transmitted to the controller 150 through the I/F 116, and is displayed on the display unit 154. In addition, the image is recorded in the recording unit 114 (for example, a USB memory or an SD card) in accordance with an operation input from the operation unit 152. Meanwhile, the recording unit 114 may be provided in the controller 150, or may be provided in both the inspection camera 102 and the controller 150.

The illumination unit 108 is means for illuminating a subject, and includes, for example, a Light Emitting Diode (LED) lamp.

The laser range finder (LRF) 110 including a laser diode is an apparatus for irradiating the subject with a laser beam to measure a flight time until reflected light returns and to measure a distance to an object and projecting a laser sight onto the subject. The operator can confirm the laser sight projected on to the subject on the display unit 154 of the controller 150 to control the pose of the inspection camera 102 by moving a platform 118 by a motor M through the operation unit 152, while confirming the position and pose of the inspection camera 102 with respect to the subject. Meanwhile, information regarding a distance to the subject may be acquired by the LRF 110, or may be acquired by setting the imaging unit 106 as a stereoscopic camera.

The positional information acquisition unit 112 acquires positional information (for example, GPS information) of an inspection location. Meanwhile, the positional information of the inspection location may be acquired by installing an Integrated Circuit (IC) chip storing positional information at each inspection location of the target structural object and performing communication between the inspection camera 102 and the IC chip.

Figure 3:
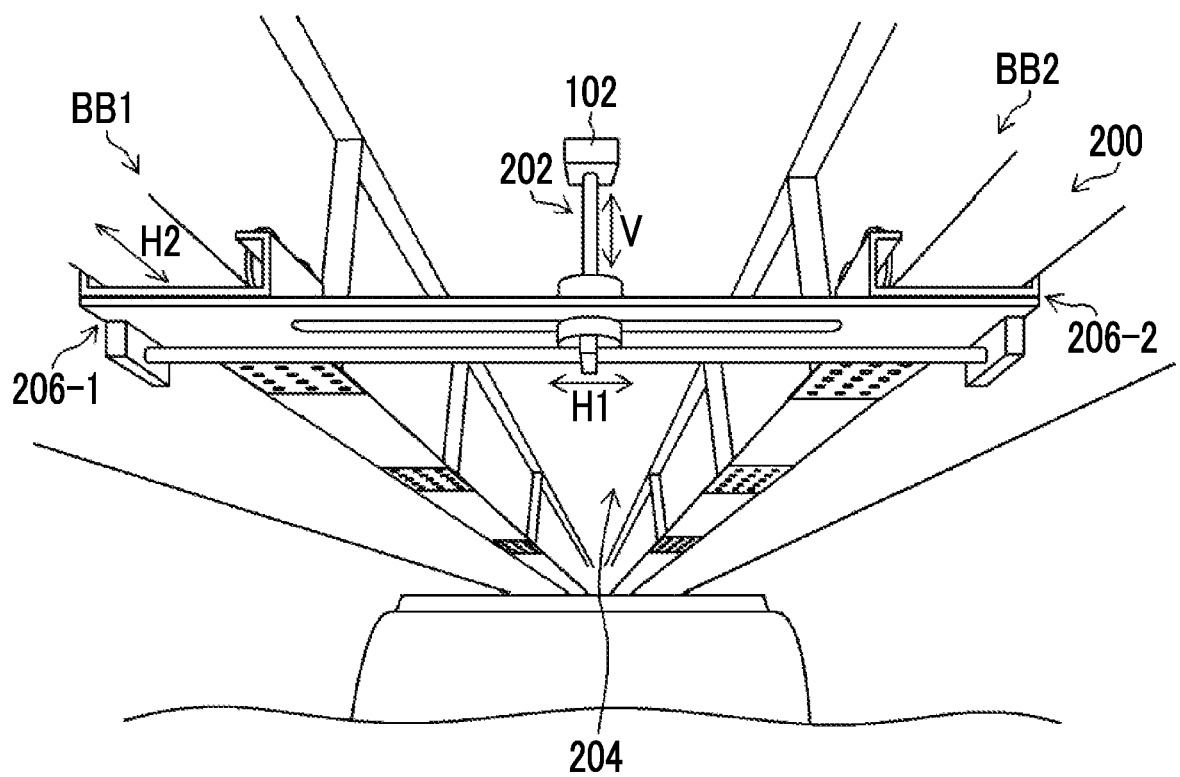
FIG. 3 is a perspective view illustrating an example of a method of mounting and operating an inspection camera in a case where a target structural object is a bridge.

FIG. 3 is a perspective view illustrating an example of a method of mounting and operating an inspection camera in a case where a target structural object is a bridge. Meanwhile, in FIG. 3, the horizontal direction (H1 direction and direction H2) is a direction along a surface which is substantially parallel to a bridge girder, and the vertical direction (direction V) which is substantially perpendicular to a surface substantially parallel to the bridge girder.

As illustrated in FIG. 3, an inspection camera mounting member 200 includes an inspection camera mounting unit 202, a rail 204, and mounting members 206-1 and 206-2.

The mounting members 206-1 and 206-2 are members for mounting the rail 204 to a target structural object, and are respectively mounted on bridge girders BB1 and BB2. The number and types of mounting members 206-1 and 206-2 can be modified depending on an inspection location, the bridge girders, an interval between bridge piers, and the number of bridge piers of the target structural object (bridge).

The inspection camera 102 is fixed to the inspection camera mounting unit 202 by fixing means not shown in the drawing. The inspection camera mounting unit 202 is movable in a direction H1 along the rail 204, for example, by a ball screw. A block (wheel) not shown in the drawing is mounted to the mounting members 206-1 and 206-2, and is movable in a direction H2 along the bridge girders BB1 and BB2. That is, the inspection camera mounting unit 202 is movable in the direction H1 and the direction H2 perpendicular to the direction H1 by hand or by the driving of a motor, and is movable in the direction V by the platform 118.

Meanwhile, a method of performing an inspection by mounting the inspection camera 102 to a portion of a structural object such as a bridge girder or a bridge pier is not limited to the example of FIG. 3. The shape of the rail, the number of mounting members, and the shape thereof are determined depending on the arrangement and shapes of the bridge pier and the like. In addition, it is also possible to use a high place type in which a tripod or the like is installed below a bridge and the inspection camera 102 is installed in the tripod through a pole.

In addition, the inspection camera 102 may be loaded in an unmanned aircraft (for example, a multi-copier, a drone, or the like) to image a target structural object. In a case where the unmanned aircraft is used, for example, positional information of an inspection location may be acquired by installing an IC chip storing positional information at each inspection location of the target structural object and performing communication between the inspection camera 102 and the IC chip, or Global Positioning System (GPS) information may be used.

[Specific Example of Inspection Plan]

FIG. 4 is a diagram illustrating a specific example of the output of attribute information and an inspection plan in a case where a target structural object is a bridge.

Structural object specification information is information for specifying a structural object. In the example illustrated in FIG. 4, the structural object specification information includes an item number (identification (ID) number) which is uniquely allocated to each structural object and a structural object name (bridge name).

The attribute information includes structure of structural object, structure information regarding the design of a structural object, characteristic information thereof, and/or topography information thereof. Here, the structure information is, for example, information regarding a basic structure of the structural object (a rigid-frame bridge, a suspension bridge, an oblique bridge, an arch bridge, a movable bridge (draw bridge), and the like), a material (steel, concrete, mortar, brick, or stone, or a combination thereof), information regarding a structure for each portion of the structural object (the material and/or shape of a bridge girder, the material and/or shape of a steel plate girder, a steel box girder, a Prestressed Concrete (PC) box girder, or a bridge pier, and the like), a purpose (for example, for vehicles (number of lanes), for humans, or for two-wheeled vehicles, an aqueduct, and the like), or the like. The characteristic information is, for example, an elapsed time after completion or opening, the elapsed time from an inspection/repair, a constructor, inspection and/or repair companies, or the like. In addition, the topography information is, for example, positional information (Global Positioning System (GPS) information and the like), regional information (a distance from mountain forest, river, lake and/or sea, the strength of seacoast, plain, mountain ridge, and ground, and the like), climate information (the frequency of rainfall or snowfall, the amount of rainfall, or the amount of snowfall (every year, every season, a maximum value, an average value, and the like)), the frequency of occurrence of the falling of a thunderbolt and/or a gust, the state of damage due to the falling of a thunderbolt and/or a gust (every year, every season, a maximum value, an average value, and the like), the frequency of landing of a typhoon, and the like), frequency of occurrence of an earthquake, a maximum seismic intensity, an average seismic intensity, and use information such as the volume of traffic. In the example illustrated in FIG. 4, the structural object attribute information (bridge attribute information) includes information regarding the material and/or structure of a bridge girder as the structure information, includes information regarding the years after construction, a spraying history of an antifreezing admixture with respect to a concrete member, and a constructor as the characteristic information, and includes information regarding an area where a bridge is built as the topography information.

Inspection result information is information indicating a past inspection result for an inspection location, and is, for example, the date and time of an inspection, the presence or absence of damage, the type of damage, and the degree of damage (the size (length and width) of a crack, the orientation of the crack, changes in the crack with time, a spraying history of an antifreezing admixture, and the like). In the example illustrated in FIG. 4, the inspection result information (previous inspection result) includes an evaluation value for each member (concrete member evaluation, steel member evaluation (indicated by, for example, A (slight deterioration), B (deteriorated), or C (serious deterioration)), and information indicating the date and time of an inspection for an inspection location. Meanwhile, in the example illustrated in FIG. 4, one piece of inspection result information is indicated for each structural object, but the inspection result information may be created for each of a plurality of locations to be inspected for each structural object (bridge) and may be recorded.

The recommended inspection time information is information indicating execution time of an inspection plan, and is calculated by the inspection plan creation unit 22 on the basis of attribute information of each structural object. Regarding the recommended inspection time information, it is preferable to advance a recommended inspection time, for example, in a case where regional information is "seacoast". In addition, it is preferable that the recommended inspection time is advanced as the years after construction increase and as the number of times of spraying of an antifreezing admixture increases.

In addition, the inspection plan may be created so as to match expected times of the inspection plan and the repair plan by receiving an input of an inspection plan and a repair plan (for example, a legal inspection regarding a target structural object, or the like) which is made in advance for the target structural object through the I/F 26 (plan input means) or the like.

In addition, the recommended inspection time may be determined so as to match an expected time of the inspection plan by receiving an input of an inspection plan (for example, a legal inspection regarding the target structural object, or the like) which is made in advance for the target structural object from another system through the I/F 26 (plan input means) or the like.

Meanwhile, in this embodiment, a list of inspection plans of a plurality of structural objects (bridges) is displayed, but the mode of output of the inspection plans is not limited thereto. For example, the inspection plan may be displayed for each structural object, or an inspection plan may be created for each of a plurality of inspection locations and may be displayed for each structural object. That is, even in one structural object, for example, there may be a difference in an inspection time and/or the frequency of an inspection between at a location facing sea and at a location not facing sea.

Figure 5:
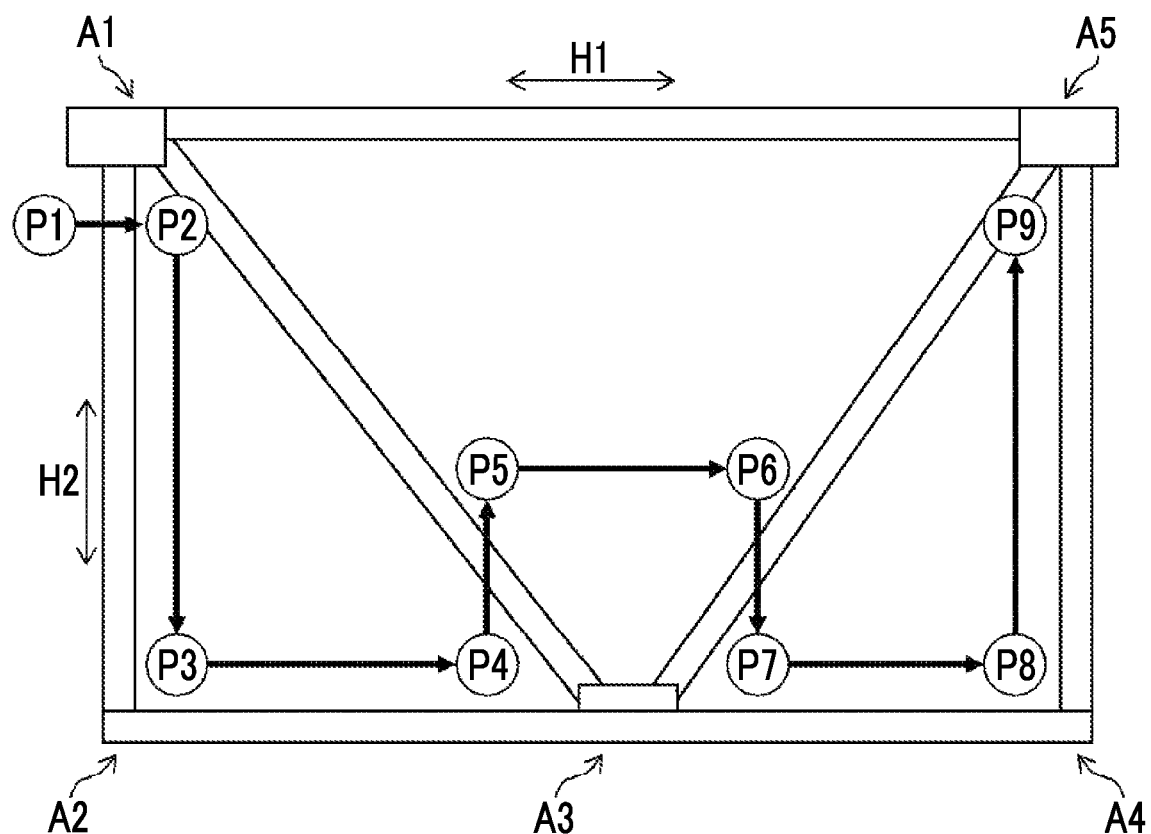
FIG. 5 is a plan view illustrating a movement route of an inspection camera in a case where a target structural object is a bridge.

FIG. 5 is a plan view illustrating a movement route of an inspection camera in a case where a target structural object is a bridge pier. FIG. 5 illustrates a state where a floor system (one coffer) of a bridge is looked up from below. In the example illustrated in FIG. 5, reference numeral and sign A1 to reference numeral and sign A5 denote a location where a plurality of steel members are bonded to each other. Meanwhile, in FIG. 5, the horizontal direction (direction H1 and direction H2) is a direction along a surface which is substantially parallel to a bridge girder, and the vertical direction (direction V) is a direction which is substantially perpendicular to the bridge girder.

As illustrated in FIG. 5, the inspection camera 102 starts imaging from a position P1, moves in the direction H1 to reach a position P2, and images a bonding portion A2 of the bridge pier. The inspection camera moves in the direction H2 to reach a position P3, and images a bonding portion A3 of the bridge pier. In a case where the suspension type inspection camera mounting member 200 (see FIG. 3) is used, the pose of the inspection camera 102 is adjusted so that the bonding portions A2 and A3 of the bridge pier are looked upwards obliquely from below by the platform 118 of the inspection camera 102 at the position P2 and P3.

Similarly, after the inspection camera moves in the direction H1 to read a position P4 and images the bonding portion A3 from the left side in the drawing, the inspection camera moves in the direction H2 to read a position P5, images a planar image of the floor system, and moves in the direction H1 to also capture a planar image of the floor system at a position P6. The inspection camera 102 is controlled so as to face right above at the positions P5 and P6.

Next, the inspection camera moves to a position P7 to image the bonding portion A3 from the right side in the drawing. Then, the inspection camera moves to positions P8 and P9 to respectively image bonding portions A4 and A5.

In the example illustrated in FIG. 5, a movement route of the inspection camera 102 is set such that the inspection camera 102 moves in one way along the rail 204 disposed in the direction H1 and a movement distance becomes as short as possible. That is, the movement route of the inspection camera 102 is determined on the basis of a positional relationship between inspection required locations, the type and shape of the inspection camera mounting member 200, a mounting direction of the rail 204, the angle of view of the inspection camera 102, an angle at which the platform 118 can be driven, and the like.

[Inspection Plan Drafting Support Method]

Figure 6:
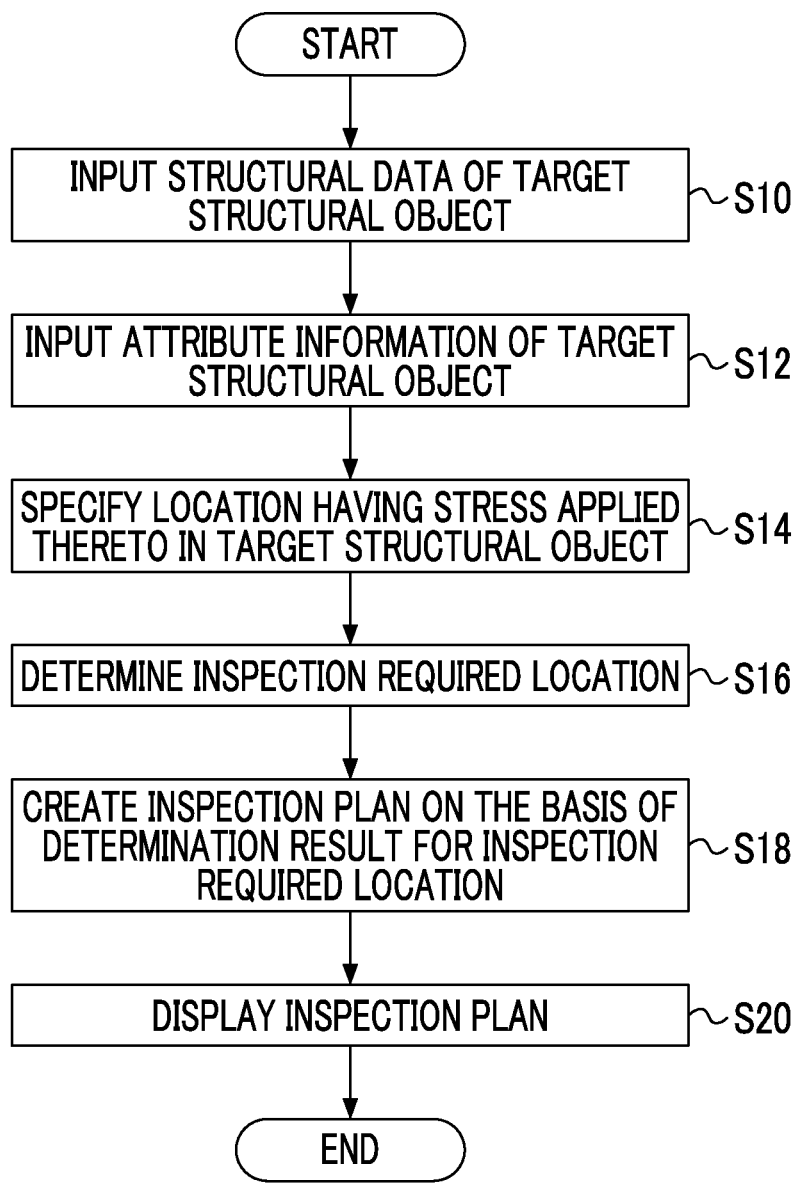
FIG. 6 is a flow chart illustrating an inspection plan drafting support process according to the embodiment of the invention.

FIG. 6 is a flow chart illustrating an inspection plan drafting support process according to the embodiment of the invention.

First, the structural data input unit 16 receives an input of structural data of a target structural object to be inspected (step S10), and the attribute information input unit 18 receives an input of attribute information of the target structural object (step S12). Meanwhile, in a case where precise design data is not present, it is possible to acquire structural data from image data of the target structural object.

Next, the inspection location determination unit 20 specifies a location having stress applied thereto in the target structural object (step S14), and determines an inspection required location of the target structural object on the basis of a result of the specification in step S14 (step S16).

Next, the inspection plan creation unit 22 creates an inspection plan on the basis of the determination result for the inspection required location in step S16 (step S18), and outputs the created inspection plan to the display unit 24. Thereby, the inspection plan is displayed on the display unit 24 (step S20). A configuration is adopted in which the inspection plan created as described above can be output to the inspection device 100 and can be displayed, and thus it is possible to perform the created inspection plan while confirming the inspection plan at the scene.

Meanwhile, the invention can also be implemented as an inspection plan drafting support program causing a computer to realize the above-described processing, a non-transitory recording medium having the program recorded thereon, or a program product.

EXPLANATION OF REFERENCES

10: inspection plan drafting support system
12: control unit
14: input unit
16: structural data input unit
18: attribute information input unit
20: inspection location determination unit
22: inspection plan creation unit
24: display unit
26: communication interface (I/F)
100: inspection device
102: inspection camera
104: camera control unit
106: imaging unit
108: illumination unit
110: LRF
112: positional information acquisition unit
114: recording unit
116: communication interface (I/F)
150: controller
152: operation unit
154: display unit

What is claimed is:

1. An inspection plan drafting support system for supporting drafting of an inspection plan for a structural object, the system comprising:
a processor configured to,
input structural data indicating a structure of the structural object;
input attribute information indicating structure information regarding a design, characteristic information, and/or topography information of the structural object;
determine inspection required locations of the structural object on the basis of the structural data and the attribute information; and
create the inspection plan before an inspection for the structural object on the basis of a positional relationship between the inspection required locations, and inspection priorities of the inspection required locations; and
a display that outputs the inspection plan,
wherein the inspection plan includes at least an imaging order of an inspection camera and control information of the inspection camera including the direction and angle of the inspection camera.

2. The inspection plan drafting support system according to claim 1,
wherein the processor inputs the attribute information including at least one of a material, elapsed years, or a lifespan of the structural object, or an installation environment or a repair history of the structural object.

3. The inspection plan drafting support system according to claim 1, further comprising:
an interface that acquires stereoscopic structure information obtained by measuring the structural object,
wherein the processor calculates the positional relationship between the inspection required locations on the basis of the structural data and the stereoscopic structure information, and determines the order of inspection for the inspection required locations on the basis of the positional relationship to create the inspection plan for the structural object.

4. The inspection plan drafting support system according to claim 2, further comprising:
an interface that acquires stereoscopic structure information obtained by measuring the structural object,
wherein the processor calculates the positional relationship between the inspection required locations on the basis of the structural data and the stereoscopic structure information, and determines the order of inspection for the inspection required locations on the basis of the positional relationship to create the inspection plan for the structural object.

5. The inspection plan drafting support system according to claim 3,
wherein the interface acquires stereoscopic structure information indicating a stereoscopic positional relationship between the inspection required locations of the structural object and distance information from a stereoscopic image obtained by imaging the structural object.

6. The inspection plan drafting support system according to claim 4,
wherein the interface acquires stereoscopic structure information indicating a stereoscopic positional relationship between the inspection required locations of the structural object and distance information from a stereoscopic image obtained by imaging the structural object.

7. The inspection plan drafting support system according to claim 1, the processor further configured to:
calculate distortion of the structural object on the basis of the structural data,
wherein the processor creates the inspection plan on the basis of the distortion.

8. The inspection plan drafting support system according to claim 1, the processor further configured to:
acquire a result of detection of damage occurring in a past inspection,
wherein the processor creates the inspection plan on the basis of the detection result of the damage, in addition to the positional relationships between the inspection required locations and the inspection priorities of the inspection required locations.

9. The inspection plan drafting support system according to claim 2, the processor further configured to:
acquire a result of detection of damage occurring in a past inspection,
wherein the processor creates the inspection plan on the basis of the detection result of the damage, in addition to the positional relationships between the inspection required locations and the inspection priorities of the inspection required locations.

10. The inspection plan drafting support system according to claim 3, the processor further configured to:
acquire a result of detection of damage occurring in a past inspection,
wherein the processor creates the inspection plan on the basis of the detection result of the damage, in addition to the positional relationships between the inspection required locations and the inspection priorities of the inspection required locations.

11. The inspection plan drafting support system according to claim 5, the processor further configured to:
acquire a result of detection of damage occurring in a past inspection,
wherein the processor creates the inspection plan on the basis of the detection result of the damage, in addition to the positional relationships between the inspection required locations and the inspection priorities of the inspection required locations.

12. The inspection plan drafting support system according to claim 1, the processor further configured to:
receive an input of at least one plan out of the inspection plan or a repair plan for the structural object,
wherein the processor creates the inspection plan on the basis of the plan.

13. The inspection plan drafting support system according to claim 2, the processor further configured to:
receive an input of at least one plan out of the inspection plan or a repair plan for the structural object,
wherein the processor creates the inspection plan on the basis of the plan.

14. The inspection plan drafting support system according to claim 3, the processor further configured to:
receive an input of at least one plan out of the inspection plan or a repair plan for the structural object,
wherein the processor creates the inspection plan on the basis of the plan.

15. The inspection plan drafting support system according to claim 5, the processor further configured to:
receive an input of at least one plan out of the inspection plan or a repair plan for the structural object,
wherein the processor creates the inspection plan on the basis of the plan.

16. The inspection plan drafting support system according to claim 7, the processor further configured to:
receive an input of at least one plan out of the inspection plan or a repair plan for the structural object,
wherein the processor creates the inspection plan on the basis of the plan.

17. The inspection plan drafting support system according to claim 12,
wherein the processor receives an input of an inspection time determined for the structural object, and
wherein the processor makes an inspection time, which is determined for the structural object based on the inspection plan, match the inspection time based on the input.

18. The inspection plan drafting support system according to claim 13,
wherein the processor receives an input of an inspection time determined for the structural object, and
wherein the processor makes an inspection time, which is determined for the structural object based on the inspection plan, match the inspection time based on the input.

19. An inspection plan drafting support method for supporting drafting of an inspection plan for a structural object, the method comprising:
inputting structural data indicating a structure of the structural object;
inputting attribute information including information indicating an attribute of the structural object;
determining inspection required locations of the structural object on the basis of the structural data and the attribute information;
creating the inspection plan before an inspection for the structural object on the basis of a positional relationship between the inspection required locations, and inspection priorities of the inspection required locations; and
outputting the created inspection plan,
wherein the inspection plan includes at least an imaging order of an inspection camera and control information of the inspection camera including the direction and angle of the inspection camera.

20. A non-transitory computer recording medium storing n inspection plan drafting support program for supporting drafting of an inspection plan for a structural object, the inspection plan drafting support program causing a computer to realize:
- a structural data input function for inputting structural data indicating a structure of the structural object;
- an attribute information input function for inputting attribute information indicating structure information regarding a design, characteristic information, and/or topography information of the structural object;
- a determination function for determining inspection required locations of the structural object on the basis of the structural data and the attribute information;
- a creation function for creating the inspection plan before an inspection for the structural object on the basis of a positional relationship between the inspection required locations, and inspection priorities of the inspection required locations; and
- an output function for outputting the inspection plan created by the creation function,
- wherein the inspection plan includes at least an imaging order of an inspection camera and control information of the inspection camera including the direction and angle of the inspection camera.

* * * * *